(12) United States Patent
Strasinsky

(10) Patent No.: US 10,680,499 B2
(45) Date of Patent: Jun. 9, 2020

(54) ELECTRICAL MACHINE

(71) Applicant: Bayerische Motoren Werke Aktiengesellschaft, Munich (DE)

(72) Inventor: Simon Strasinsky, Neufahrn bei Freising (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/038,349

(22) Filed: Jul. 18, 2018

(65) Prior Publication Data
US 2018/0323687 A1 Nov. 8, 2018

Related U.S. Application Data

(63) Continuation of application No. PCT/EP2017/050795, filed on Jan. 16, 2017.

(30) Foreign Application Priority Data

Jan. 21, 2016 (DE) .................. 10 2016 200 766

(51) Int. Cl.
*H02K 13/02* (2006.01)
*H02K 13/00* (2006.01)
*H01R 39/08* (2006.01)

(52) U.S. Cl.
CPC ............. *H02K 13/02* (2013.01); *H01R 39/08* (2013.01); *H02K 13/003* (2013.01)

(58) Field of Classification Search
CPC ....... H02K 13/02; H02K 13/003; H01R 39/08
USPC ........................................................ 310/232
See application file for complete search history.

(56) References Cited

U.S. PATENT DOCUMENTS

| 2,534,520 | A | | 12/1950 | Katcher |
| 3,977,816 | A | * | 8/1976 | Laing .................. B60H 1/3222 417/355 |
| 5,804,903 | A | | 9/1998 | Fisher et al. |
| 5,949,174 | A | * | 9/1999 | Moss ..................... H01R 39/06 310/128 |
| 6,169,347 | B1 | | 1/2001 | Sakamoto et al. |

(Continued)

FOREIGN PATENT DOCUMENTS

| CN | 103248174 A | 8/2013 |
| DE | 725 801 A | 9/1942 |

(Continued)

OTHER PUBLICATIONS

International Search Report (PCT/ISA/210) issued in PCT Application No. PCT/EP2017/050795 dated Apr. 6, 2017 with English translation (five pages).

(Continued)

*Primary Examiner* — Terrance L Kenerly
(74) *Attorney, Agent, or Firm* — Crowell & Moring LLP

(57) ABSTRACT

The invention relates to an electrical machine, such as a motor vehicle that includes a rotor connected to a hollow shaft mounted such that it can rotate about an axis of rotation. The electric machine also includes a rotary transformer that includes a first slip ring and a first brush adjacent thereto. The first slip ring may be arranged inside the hollow shaft and is connected thereto. The invention also relates to a motor vehicle that includes a drive wheel that is operatively connected to the electrical machine.

11 Claims, 3 Drawing Sheets

(56) References Cited

U.S. PATENT DOCUMENTS

| | | | |
|---|---|---|---|
| 6,628,338 B1* | 9/2003 | Elberbaum | G08B 13/1963 |
| | | | 348/373 |
| 2002/0140313 A1 | 10/2002 | Noya et al. | |
| 2010/0127585 A1* | 5/2010 | Fee | H02K 11/40 |
| | | | 310/71 |
| 2013/0200757 A1* | 8/2013 | Schroeder | H02K 13/003 |
| | | | 310/68 B |
| 2013/0241342 A1* | 9/2013 | Soeda | H02K 11/40 |
| | | | 310/239 |

FOREIGN PATENT DOCUMENTS

| | | |
|---|---|---|
| DE | 66 04 842 U | 3/1970 |
| DE | 79 23 750 U1 | 1/1980 |
| DE | 10 2011 000 242 B4 | 1/2013 |
| EP | 2 426 793 A1 | 3/2012 |
| JP | 2000-77150 A | 3/2000 |
| WO | WO 97/01200 A1 | 1/1997 |
| WO | WO 2012/028992 A1 | 3/2012 |

OTHER PUBLICATIONS

German-language Written Opinion (PCT/ISA/237) issued in PCT Application No. PCT/EP2017/050795 dated Apr. 6, 2017 (six pages).
German-language Search Report issued in counterpart German Application No. 10 2016 200 766.1 dated Oct. 6, 2016 with partial English translation (11 pages).
Chinese-language Office Action issued in counterpart Chinese Application No. 201780003909.4 dated Jun. 18, 2019 with English translation (20 pages).

* cited by examiner

ELECTRICAL MACHINE

CROSS REFERENCE TO RELATED APPLICATIONS

This application is a continuation of PCT International Application No. PCT/EP2017/050795, filed Jan. 16, 2017, which claims priority under 35 U.S.C. § 119 from German Patent Application No. 10 2016 200 766.1, filed Jan. 21, 2016, the entire disclosures of which are herein expressly incorporated by reference.

BACKGROUND AND SUMMARY OF THE INVENTION

The invention relates to an electric machine having a rotor which is connected to a hollow shaft which is mounted so as to be rotatable about an axis of rotation. An electric machine is preferably understood here to be an electric motor, but is also understood to be a generator. The electric machine is, for example, a component of a motor vehicle and serves, for example, to drive the motor vehicle. The invention also relates to a motor vehicle having such an electric machine.

In order to avoid or reduce emissions of pollutants, driven wheels of a motor vehicle are driven by an electric motor. In this context, for example, a torque which is applied by an internal combustion engine is amplified by the electric motor, and the motor vehicle is therefore configured as what is referred to as a hybrid vehicle. In one alternative to this, the motor vehicle does not have an internal combustion engine but only the electric motor or a number of electric motors, where each driven wheel is assigned, for example, one of the electric motors configured as a wheel hub motor. In this case, the motor vehicle drive is provided purely electrically. So that the torque which is applied by the respective electric motor can be regulated independently of the rotational speed of the electric motor, an externally excited electric motor is used as the electric motor, the rotor of which externally excited electric motor therefore does not include permanent magnets, but rather an electromagnet. The latter has to be energized for correct operation. Owing to the rotational movement of the rotor, which takes place during operation, this requires a rotary transformer by which electrical contact can be produced between a rotationally fixed connection of the electric motor and the rotating electromagnet. The rotary transformer has a slip ring which is fitted onto the circumference of a shaft and over which a brush passes as a rotationally fixed part.

Such a rotary transformer is connected by a flange to the end side of a housing of the electric motor, on the "B side" thereof, which increases the required installation space of the drive in the axial direction. As a result, the use of such an electric motor as a wheel hub motor is not made possible. In order to make available a comparatively large torque, it is necessary for the rotor to have a comparatively large diameter. The rotor itself is attached to a shaft, which is mounted so as to be rotatable about the axis of rotation of the electric motor. In order, in this context, to achieve a comparatively high level of mechanical robustness and nevertheless a comparatively low level of inertia and therefore comparatively high dynamics, the shaft is configured as a hollow shaft. If a rotary transformer is then attached to such a shaft, the transformer therefore also has to have an increased extent in the radial direction. Therefore, the required installation space is increased further. Owing to the enlarged housing of the rotary transformer, the weight of the electric motor is also increased.

The invention is based on the object of disclosing a suitable electric machine having a rotor which is connected to a hollow shaft, and a motor vehicle having an electric machine, where, for example, the installation space is reduced, and where the reliability is preferably improved, and where, for example, the service life and/or efficiency level are increased.

The electric machine is, for example, a generator, such as an electric motor. For example, the electric machine is a current-excited/externally excited synchronous electric machine. The electric machine is, for example, a component of a motor vehicle and is, for instance, operatively connected to a driven wheel of the motor vehicle. For example, the electric machine is used as a drive of the motor vehicle.

The electric machine has a rotor which is connected to a hollow shaft. The rotor is suitably attached to the hollow shaft, which projects, for example, through the rotor. In one example, the rotor bears directly on the hollow shaft. For example, direct mechanical contact is produced between the rotor and the hollow shaft. The hollow shaft itself is essentially configured as a hollow cylinder and mounted so as to be rotatable about an axis of rotation. For this purpose, for example, a bearing is provided, for example, a sliding bearing, such as a roller bearing, e.g., a ball bearing or cylinder bearing. The hollow-cylindrical shaft has, for example, an external diameter which is greater than or equal to 5 cm, 10 cm, 15 cm, 20 cm or 50 cm. The external diameter of the hollow shaft is suitably smaller than 100 cm, 90 cm, 80 cm or 60 cm. For example, the internal diameter of the hollow shaft is greater than or equal to 80%, 85%, 90% or 95% of the external diameter of the hollow shaft. The hollow shaft is configured as a hollow cylinder in the region of the connection of the rotor and has, for example, an essentially constant external diameter. For example, the hollow shaft has a cross-sectional constriction which is, for instance, funnel-shaped or step-shaped. The cross-sectional constriction is spaced apart from the rotor in the axial direction, such as in a direction which is parallel to the axis of rotation. The cross-sectional constriction reduces the extent of the hollow shaft in the radial direction, such as perpendicularly with respect to the axis of rotation, and reduces the circumference of the hollow shaft, such as its extent in the tangential direction. In the section which follows, the axial, tangential and radial directions always relate to the hollow shaft and the axis of rotation thereof unless other precise details are given. For example, the hollow shaft is produced from a fiber-reinforced plastic, an aluminum, such as pure aluminum or an aluminum alloy, a steel, a stainless steel or titanium.

The electric machine also has a rotary transformer which serves to make electrical contact with a component of the rotor. The rotary transformer has a first brush which has, for example, at a free end side, elastic bristles which are produced, for example, from a copper wire. However, the first brush may be a carbon brush and is produced from pressed carbon dust, which reduces friction and the formation of sparks. The first brush is, for example, secured in a rotationally fixed fashion with respect to the rotatably mounted hollow shaft.

The rotary transformer also has a first slip ring on which the first brush bears, with the result that the first brush is in electrical contact with the first slip ring. A direct mechanical contact is produced between the first brush and the first slip ring. The first slip ring is arranged within the hollow shaft. Thus, for example, the first slip ring is surrounded in the radial direction by the hollow shaft. The external radius of the first slip ring is therefore smaller than the external radius of the hollow shaft, for example, smaller than or equal to the internal radius of the hollow shaft in the region of the positioning of the first slip ring. The first slip ring is connected to the hollow shaft, for example, attached thereto. The first slip ring is therefore mounted in a rotationally fixed fashion with respect to the hollow shaft and consequently in a rotatable fashion with respect to the first brush. The first slip ring is suitably arranged concentrically with respect to the axis of rotation. The first slip ring is, for instance, configured in a rotationally symmetrical fashion with respect to the axis of rotation.

The first slip ring is, for example, connected to a mounting element which is connected to the hollow shaft, for example by positive engagement and/or frictional engagement or by further attachment, such as an adhesive. For example, the mounting element is pressed into the hollow shaft. The mounting element is produced from an electrically non-conductive material, such as a plastic. The first slip ring itself is produced from an electrically conductive material, such as, for example, a metal, such as from a copper material, such as copper, brass or bronze. The first slip ring is consequently connected in a rotationally fixed fashion to the hollow shaft, for which reason, by the first slip ring and the first brush, electrical contact is made possible with a part of the rotor which rotates together with the hollow shaft and a stationary electric part of the electric machine which is in electrical contact with the first brush. In this context, the position of the electrical contact between the first brush and the first slip ring is offset with respect to the internal diameter of the hollow shaft in the direction of the axis of rotation.

Owing to the electrical contact, which is offset radially toward the inside, between the first brush and the first slip ring, a reduced relative speed occurs between the brush and slip ring when there is rotational movement of the hollow shaft. As a result, abrasion and therefore wear are reduced, which increases the service life of the components of the rotary transformer. In addition, owing to the components of the rotary transformer which are arranged within the hollow shaft, the installation space of the electric machine in the radial and in the axial direction is reduced, which, for example, increases the degree of integration. Also, owing to the first slip ring which is made smaller, the weight of the electric machine and therefore also the inertia are reduced, leading to increased dynamics of the electric machine.

In an example, the electric machine has a stator which includes, for example, a number of electromagnets, each of which includes, for example, an electrical coil. For instance, the electrical coils are wound onto a laminated core of the stator. The axes of the electrical coils run, for example, in the radial direction with respect to the axis of rotation, with the result that when the electromagnets are energized a magnetic field which runs in the radial direction is produced by the electromagnets. The stator has multiple phases, e.g. 6 phases. For example, the stator has three phases, consequently has three stator windings, where each of the stator windings is assigned, for instance, an equal number of electromagnets. For example, the stator surrounds the rotor in the radial direction, where an air gap is formed between them. Thus, for example, the electric machine is an internal rotor. Therefore, installation space which is not used otherwise within the hollow shaft is utilized by the rotary transformer, which brings about a reduced installation space.

For example, frictional engagement is produced between the first brush and the first slip ring, for which purpose a first spring element, which is, for example, a helical spring, is used. For example, force is applied to the first brush in the radial direction by the first spring element, for which reason the first brush is pressed against the first slip ring in the radial direction, directed, for example, toward the outside or the inside. However, the frictional engagement takes place between the first brush and the first slip ring, in a direction of force which is parallel to the axis of rotation of the hollow shaft. Thus, for example, the first brush is pressed against a bearing face of the first slip ring which is perpendicular to the axis of rotation of the hollow shaft and therefore is parallel to the end side of the electric machine. As a result, the mounting of the rotary transformer is simplified, since initially the first slip ring can be connected to the hollow shaft. In a further working step, the first brush can be introduced into the hollow shaft in the axial direction, where in this context, frictional engagement is produced between the first brush and the first spring element.

In another example, the first slip ring is configured in a belt shape and is attached to the internal wall of the hollow shaft. For instance, the first slip ring is configured as a hollow cylinder, which simplifies fabrication and mounting. The first slip ring is expediently arranged concentrically with respect to the axis of rotation. For example, the thickness of the first slip ring, such as the distance between its internal diameter and external diameter, is between 70% and 120% of the thickness of the hollow shaft. Consequently, the first slip ring is comparatively robust. For example, the cross section of the first slip ring is essentially and/or approximately I-shaped parallel to the axis of rotation. For instance, the first slip ring includes a collar which runs in the radial direction. Thus, for example, the cross section of the first slip ring parallel to the axis of rotation is essentially L-shaped, where the collar which is formed by the second L limb is directed outward, for instance, in the radial direction. The first brush preferably bears on the end side of the collar.

For example, the rotor includes a rotor winding which is placed in electrical contact with the first slip ring. Consequently, the rotary transformer serves to perform electrical energization of the rotor winding. The rotor winding itself is produced by an enameled copper wire and wound around a rotor packet of the rotor, which rotor packet is attached, for example, to the hollow shaft, for example by positive engagement and/or frictional engagement. The rotor packet is suitably shrink-fitted onto the hollow shaft. The rotor packet is produced, for example, from a solid material and, for example, a sintered iron. For instance, the rotor packet is a laminated core. The laminated core itself has a number of metal plates which are electrically insulated from one another (via, e.g., electrical plates), which are stacked one on top of the other, for example, in the axial direction. On the other hand, the axis of the rotor winding runs in the radial direction, with the result that during operation a radially directed magnetic field is produced by the rotor winding. In this connection, the first slip ring is configured in an axis-symmetrical fashion, so as to ensure that electrical contact is always produced between the first brush and the first slip ring independently of the angular position of the hollow shaft, and consequently of the first slip ring.

In another example, the electrical contact between the first slip ring and the rotor winding is formed by a first connection, where the first connection is placed in electrical contact both with the first slip ring and with the rotor winding. For instance, the first connection is attached both to the first slip ring and to the rotor winding, for example, to a free end of the rotor winding. Thus, for example, the first connection is arranged electrically and, for example, also mechanically, between the rotor winding and the first slip ring, for which reason the first connection can be optimized with respect to an improved running property of the first winding, and the rotor winding can be optimized with respect to an improved production of the magnetic field. The first connection is nevertheless used to obtain a comparatively good pairing between the winding and the rotor winding.

In yet another example, the first connection is configured in a pin shape and produced from an electrically conductive material, for example, a metal, such as steel or copper. The first connection is produced in the manner of a metal rod. The first connection projects through a first radial cutout in the hollow shaft, such as a cutout which runs in the radial direction. In this context, a free end of the first connection is positioned, for example, lying radially on the inside with respect to the hollow shaft, and the remaining free end is positioned lying radially on the outside with respect to the hollow shaft. The rotor winding is connected and/or attached, to the radially outer free end, for example by soldering, welding, screwing or a clamped connection. The radially inner free end of the first connection is positioned, for instance, in a corresponding cutout or groove in the first slip ring. For example, the first connection is attached to the hollow shaft, where in this context, for example, an electrical insulation is positioned between the first connection and the hollow shaft, for which reason an electrical short circuit is avoided.

The rotary transformer suitably includes a second slip ring, which is also arranged within the hollow shaft and connected thereto. For example, the second slip ring is offset with respect to the first slip ring in the radial direction and/or in the axial direction. For example, the second slip ring is produced from an electrically conductive material, for example copper or an aluminum. The second slip ring is connected and/or attached, to the hollow shaft, for which purpose, for example, a mounting element is used, for example, the same mounting element as for the first slip ring, if one is present. The mounting element is produced from an electrically insulating material such as a plastic. The second slip ring is therefore connected in a rotationally fixed fashion to the hollow shaft, for which reason when the hollow shaft rotates about the axis of rotation, the second slip ring is also rotated.

The rotary transformer also suitably has a second brush which bears on the second slip ring, where, for example, a bearing face is produced between the brush and the slip ring. For instance, the second brush is placed in electrical contact with the second slip ring, where a direct mechanical contact is produced between the brush and the slip ring. The second brush is fixed with respect to rotation, for example, with respect to a stator of the electric machine, if one is present. The second brush has, for example, at the free end side, bristles which brush over the second slip ring during operation. The second brush, however, is for example, a carbon brush and is consequently produced from pressed carbon dust.

The second brush is, for example, structurally identical to the first brush and/or the first slip ring is structurally identical to the second slip ring, which makes possible the use of identical components. The second brush and second slip ring likewise serve to form electrical contact between the rotor and further rotationally fixed components of the electric machine. For example, the free end of the rotor winding, if one is present, is placed in electrical contact with the first slip ring, and the remaining end is placed in electrical contact with the second slip ring. In this context, for example, the first and, for example, a second, connection are present which are each arranged in a respectively separate radial cutout in the hollow shaft and project through the latter. For example, the rotary transformer includes a second spring element by which frictional engagement is produced between the second brush and the second slip ring, where the application of force takes place, for example, in the radial direction, such as in the axial direction. Thus, for example, the second brush bears on the endside of the second slip ring. The first brush and/or the second brush are configured essentially in cylindrical fashion, where one end side bears on the respective slip ring. A stranded conductor or some other type of electrical line is, for example, placed in electrical contact, and, for example, at the remaining free end.

In a further example, the second slip ring includes a smaller internal radius than the first slip ring, which makes it possible to form contact between the two slip rings by first and second brushes which are essentially arranged in the axial direction. Alternatively or in combination therewith, the second slip ring is configured in a disc shape. Consequently, the cylindrical disc is positioned concentrically with respect to the axis of rotation. The electrical contact of the second brush with the second slip ring is formed in the region of the center point of the disc, and the second brush is positioned essentially in an axis-symmetrical and/or rotationally symmetrical fashion with respect to the axis of rotation of the hollow shaft. The bearing face, for instance, intersects the axis of rotation between the second brush and the second slip ring. As a result, in this region essentially no relative movement of the second brush with respect to the second slip ring occurs, which reduces wear and friction. As a result, the durability and/or the efficiency level are increased.

For example, the rotary transformer includes a housing which is connected at the end side to an end plate of the electric machine. In this context, the end plate is positioned between the rotor and the housing of the end plate. The end plate, which, for instance, is a B-side end plate, has a bearing by which the hollow shaft is rotatably mounted, such as a roller bearing, for example a ball bearing. The housing has a first guide within which the first brush is guided. For example, a clearance fit is at least partially produced between the first brush and the first guide. For instance, the first guide is produced from an electrically non-conductive material such as a plastic. The first brush is expediently guided in the axial direction by the first guide. The first guide itself projects, for instance, into the hollow shaft and, for example, the first spring element, if one is present, is positioned within the first guide. The housing includes a second guide by which the second brush is guided, for example, in an axial direction, if the second brush is present. In this context, the two guides and consequently also the two brushes are offset with respect to one another in the radial direction, where the second brush is at a shorter distance from the axis of rotation than the first brush.

For example, the rotary transformer is positioned completely within the hollow shaft and is surrounded, for example, completely by the rotor in the radial direction. As an alternative to this example, the electrical contact between the first brush and the first slip ring or the second brush and the second slip ring is made in a region which is provided in the radial direction by the rotor. As a result, the amount of space required is reduced. As an alternative to this example, the rotary transformer is offset with respect to the rotor in the axial direction. Thus, for example, no component of the rotary transformer is surrounded in the radial direction by the rotor. For example, this permits the hollow shaft to be adapted to the respective slip ring. It also becomes possible to provide the first connection between any rotor winding and the first slip ring, without any laminated core having to have a cutout or the like.

The motor vehicle has a driven wheel, for example, two or four driven wheels. The driven wheel is operatively connected to the electric machine which has, for example, the functionality of an electric motor and/or of a generator. For instance, the electric machine serves to drive the driven wheel and is configured, for example, as a wheel hub motor. As an alternative to this example, the electric machine acts on a drive axle, for example, on a Cardan shaft, where, for example, an internal combustion engine is present which acts on the same drive axle. In summary, the motor vehicle is driven by the electric machine.

The electric machine includes a rotor which is connected to a hollow shaft which is mounted such that it can rotate about an axis of rotation. In addition, the electric machine has a rotary transformer which includes a first slip ring and a first brush bearing thereon. The first slip ring is arranged within the hollow shaft and is connected thereto.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
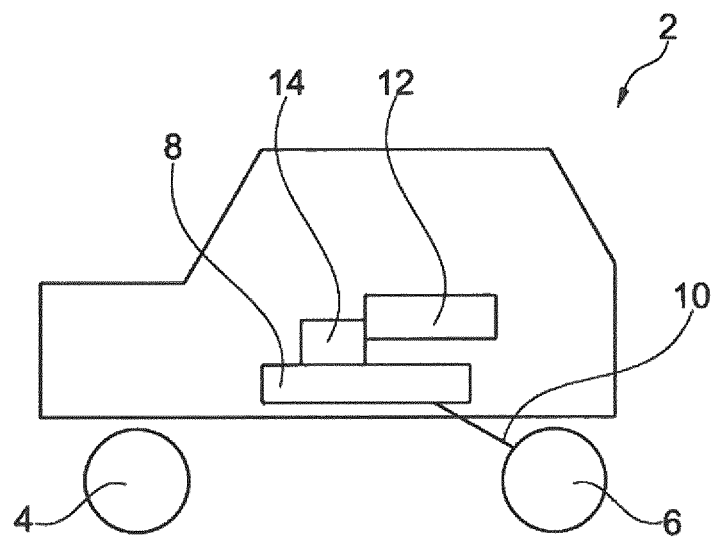
FIG. 1 illustrates a schematic view of a motor vehicle with an electric motor.

FIG. 1 is a schematic illustration of a motor vehicle 2 which has two front wheels 4 and two rear wheels which are configured as driven wheels 6. Alternatively, the driven wheels 6 are formed by the front wheels 4 or by the front wheels 4 and the rear wheels. The driven wheels 6 are driven by an electric motor 8, for which purpose, for example, drive axles 10 are used. As an alternative to this example, the electric motor 8 is configured as a wheel hub motor and is integrated into the respective driven wheel 6. The motor vehicle 2 also has an energy accumulator 12, e.g., a lithium-ion battery, and a controller 14 by which a flow of energy between the energy accumulator 12 and the electric motor 8 is set. For example, the controller 14 includes a current regulator and/or electrical voltage regulator. Thus, for example, the electric motor 8 is energized by the controller 14.

Figure 2:
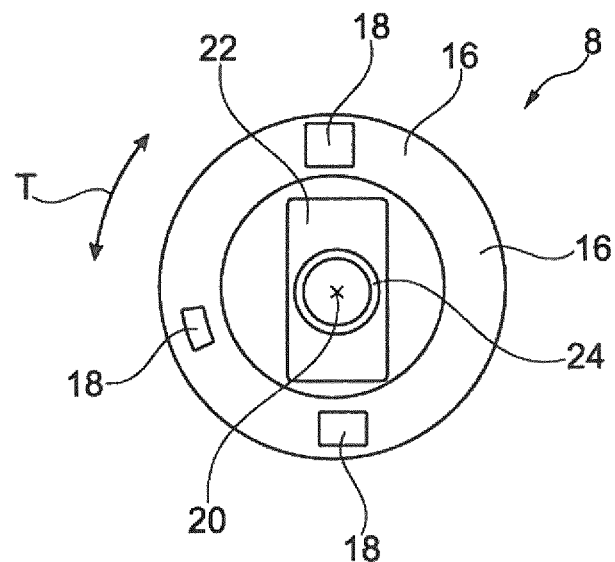
FIG. 2 illustrates a schematic plan view of a detail of the electric motor.

FIG. 2 is a schematic illustration of a plan view of the electric motor 8. The electric motor 8 includes a stator 16 which is configured in an essentially hollow cylindrical fashion and is positioned within a housing (not illustrated). The stator 16 has a number of electromagnets 18, for example three of which are illustrated. The electromagnets are connected to form three stator windings. Thus, for example, each of the electromagnets 18 is respectively assigned to one of the stator windings. The stator windings themselves are placed in electrical contact with one another, for example in a triangular circuit or a star circuit. The electromagnets 18 themselves are produced by electrical coils which are wrapped around corresponding structures of a laminated core (not illustrated) of the stator 16. The electromagnets 18 are positioned in a rotationally symmetrical fashion with respect to an axis of rotation 20 of a rotor 22 which is arranged within the stator. Thus, for example, the electric motor 8 is an internal rotor, and the electromagnets 18 are offset with respect to one another in a tangential direction "T" with respect to the axis of rotation 20. The rotor 22 is attached to a hollow shaft 24 which is arranged parallel to the axis of rotation 20 and concentrically with respect thereto, the hollow shaft 24 projecting through the rotor 22 in an axial direction "A," such as parallel to the axis of rotation 20.

Figure 3:
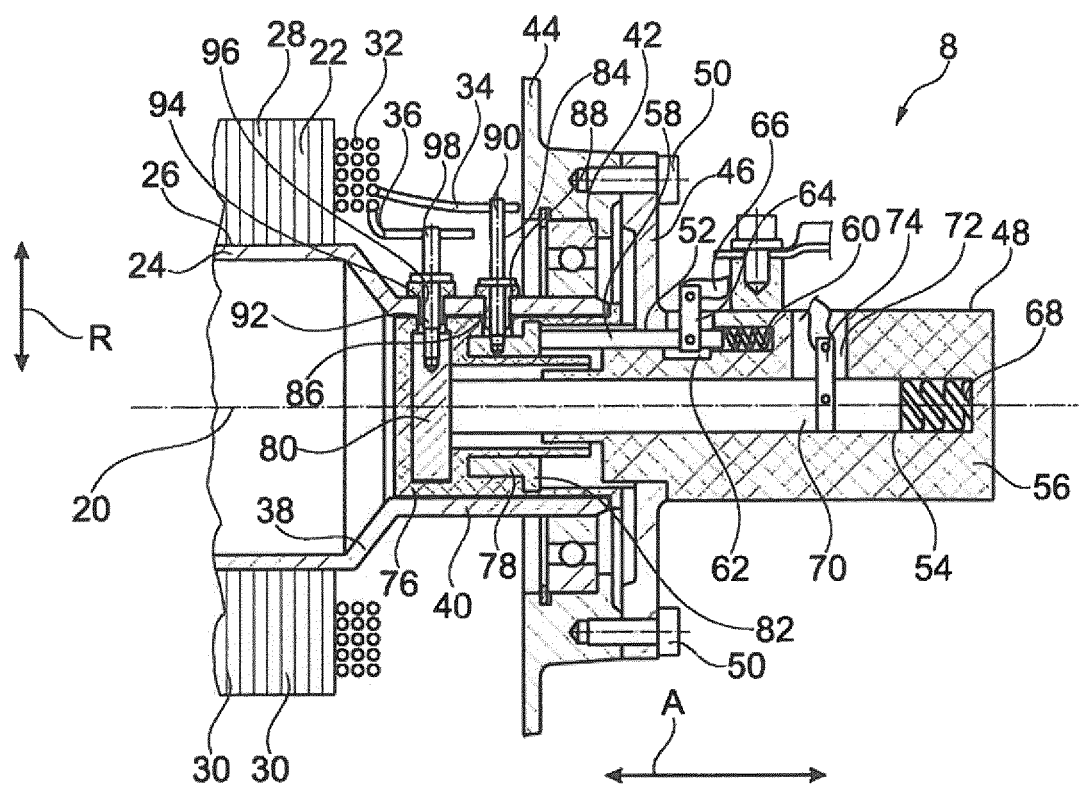
FIGS. 3 and 4 illustrate a sectional illustration, along an axis of rotation, of a first embodiment of the electric motor.
Figure 4:
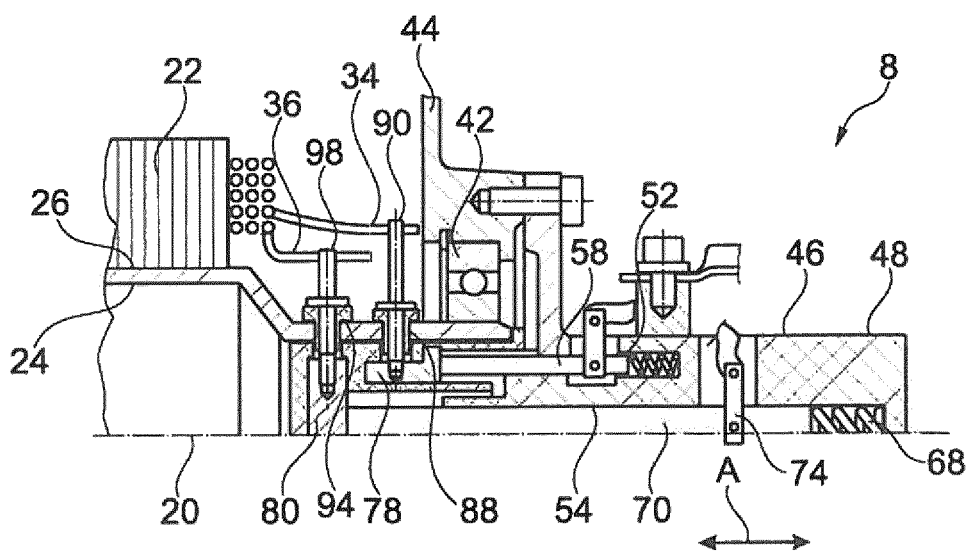

FIG. 3 illustrates a detail of the electric motor 8 in a sectional illustration along the axis of rotation 20. FIG. 4 correspondingly illustrates the electric motor, where, however, a part can be modified. The hollow shaft 24 has an attachment region 26 to which the rotor 22 is attached. The rotor 22 is therefore connected in a rotationally fixed fashion to the hollow shaft 24 in the attachment region 26. The rotor 22 bears on the circumference of the hollow shaft 24 in the attachment region 26. The part of the rotor 22 which bears here is a rotor laminated core 18, which has a number of individual metal plates 30 which are electrically insulated on one another and with respect to one another in the axial direction A. A rotor winding 32 composed of enameled copper wire, which has a first connecting end 34 and a second connecting end 36, is wound around the rotor laminated core 28. The axis of the rotor winding 32 is perpendicular to the axis of rotation 20 here, and runs through it, such as in a radial direction R.

The single-piece hollow shaft 24 which is produced from a steel, an aluminum or a glass-fiber-reinforced plastic has a funnel-shaped cross-sectional constriction 38. The attachment region 26 merges, by the cross-sectional constriction 38, into a shaft end 40 whose diameter corresponds to between 50% and 70% of the diameter of the hollow shaft 24 in the attachment region 26. The diameter in the attachment region 26 is essentially 30 cm, and the thickness, such as the difference between the internal radius and the external radius of the hollow shaft 24, is 1 cm. The shaft end 40 is mounted so as to be rotatable about the axis of rotation 20 by a bearing 42 which is configured as a ball bearing. The bearing 42 is attached to an end plate 44 which is made of an aluminum and which forms part of the housing (not illustrated) of the electric motor 8.

The housing 46 of a rotary transformer 48 is attached by screws 50 to the end plate 44 which is embodied as a B-side end plate. The housing 46 has a first guide 52, running in the axial direction A, and a second guide 54, also running in the axial direction A, which guides 52, 54 are produced by an insulation body 56 of the housing 46 which is fabricated from an electrically non-conductive plastic. The first and second guides 52, 54 are each formed with a bore hole which runs in the axial direction A. Within the first guide 52, a first brush 58, which is of essentially cylindrical design, is partially arranged. The first brush 58 is a carbon brush and is consequently produced from pressed carbon, where positive engagement is produced between the first brush 58 and the first guide 52 at the circumference of the first brush 58. In addition, within the first guide 52, a first spring element in the form of a helical spring is arranged on the end side of the first brush 58 on the base of the bore hole which forms the first guide 52. In the region of this end of the carbon brush 58, the insulation body 56 has a first cutout 62 within which a first contact element 64 is arranged and attached to the first brush 58. The first contact element 64 is electrically connected to the controller 14 by a first stranded conductor 66. The remaining free end of the first brush 58 projects into the hollow shaft 24 and is positioned within the shaft end 40. Thus, for example, this free end of the first brush 58 is surrounded by the hollow shaft 24 in the radial direction R.

A second spring element 68 is also positioned in the second guide 54, on the base thereof, as is also a second brush 70 which is likewise produced from pressed carbon dust and which has a cylindrical shape, on the circumference of which the second guide 54 bears while forming a clearance fit. In addition, the insulation body 56 has a second cutout 72 which is offset with respect to the first cutout 62 in the axial direction A and within which a second contact element 74, which is attached to the second brush 70, is positioned. The second contact element 74, which is structurally identical to the first contact element 66 and is also produced from an electrically conductive material, is also placed in electrical contact with the controller 14.

A mounting element 76 is arranged and attached in a rotationally fixed fashion to the hollow shaft 24 within the shaft end 40. The mounting element 76 is produced from an electrically insulating plastic, and a first slip ring 78 and a second slip ring 80 are attached thereto in a rotationally fixed fashion and partially embedded in the mounting element 76. The two slip rings 78, 80 are each produced from copper material, such as copper, bronze or brass, and are surrounded by the shaft end 40 and therefore by the hollow shaft 24 in the radial direction R. In this context, the mounting element 76 serves to connect the two slip rings 78, 80 to the hollow shaft 24, where the mounting element 76 in the axial direction A ends essentially at the cross-sectional constriction 38.

The first slip ring 78 is configured in a hollow-cylindrical fashion and positioned concentrically with respect to the axis of rotation 20. In addition, the first slip ring 78 has, at the end opposite the cross-sectional constriction 38, a collar 82 which runs in the radial direction R. Thus, for example, the collar 82 is configured in an annular shape. The first brush 58 is pressed against the collar 82 by the first spring element 60, with the result that frictional engagement is produced between the first brush 58 and collar 82. The application of the force therefore takes place in the axial direction A. In addition, a first connection 84, which is configured in a pin shape and runs perpendicularly with respect to the axis of rotation 20 through a radial cutout 86 in the hollow shaft 40, is placed in electrical contact with the first slip ring 78, the cutout 86 being lined with a first insulation element 88 which serves to provide electrical insulation. The first connection 84 is attached to the hollow shaft 24, and the first connecting end 34 of the rotor winding 32 is attached, for example welded, to the free end 90, lying radially on the outside, of the first connection.

The second slip ring 80 is configured in a disc shape and positioned perpendicularly with respect to the axis of rotation 20. Consequently, the second slip ring 80 has essentially an internal diameter of zero, which is therefore smaller than that of the first slip ring 78 with respect to which the second slip ring 80 is offset in the axial direction A in the direction of the cross-sectional constriction 38. A pin-shaped second connection 92 is placed in electrical contact with the second slip ring 80, and is also arranged in the radial direction R and is structurally identical to the first connection 84. The second connection 92 projects through a second radial cutout 96 in the hollow shaft 24, which cutout is lined with a second insulation element 94, with the result that a free end 98 of the second connection 92 is arranged outside the hollow shaft 24. The second connecting end 36 of the rotor winding 32 is attached to this free end 98 by welding and is consequently placed in electrical contact there.

The second brush 70 which is arranged essentially on the axis of rotation 20 is pressed against the second slip ring 80 by the second spring element 68, with the result that frictional engagement is produced between the brush 70 and slip ring 80 in the axial direction A. Consequently, the rotary transformer 48 serves to make electrical contact between the rotor winding 32 and the controller 14, for which reason the magnetic field produced by the rotor 22 can be set by the controller 14. Part of the rotary transformer 48 projects into the hollow shaft 24, but not further than as far as the cross-sectional constriction 38. As a result the rotary transformer 48 is offset with respect to the rotor 22 in the axial direction A. The mechanical contacts between the two brushes 58, 70 and their respectively assigned slip ring 78, 80 are offset with respect to the hollow shaft 24 in the direction of the axis of rotation 20, with the result that a reduced relative speed occurs between the respectively assigned parts. As a result, wear and friction of the two brushes 58, 70 is reduced, for which reason the service life is increased. In addition, the two slip rings 78, 80 are embodied in a way which provides a comparative saving in material, and are also offset in the direction of the axis of rotation 20, which increases the dynamics of the electric motor 8.

Figure 5:
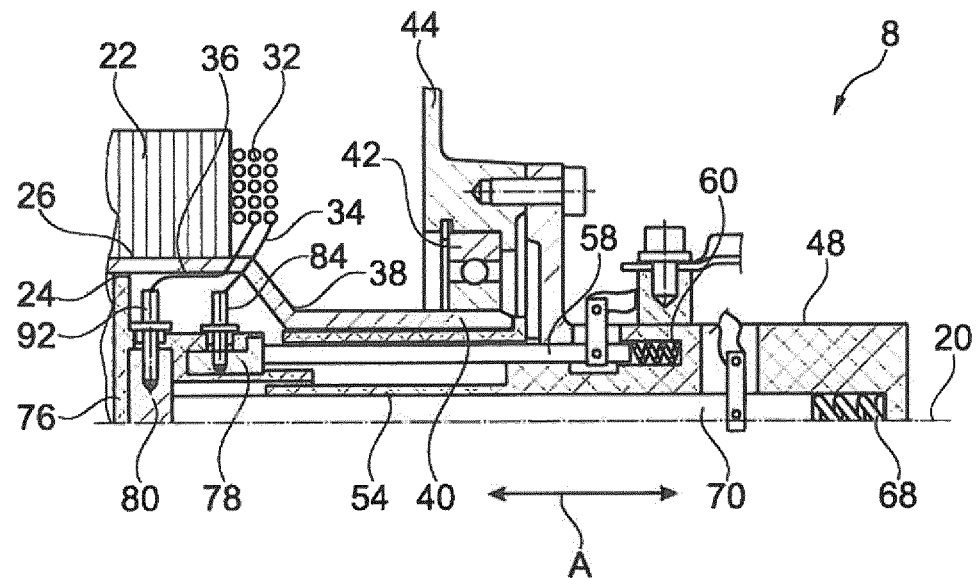
FIGS. 5 and 6 each illustrates further embodiments of the electric motor according to FIG. 4.

FIG. 5 illustrates a further embodiment of the electric motor 8, where the mounting element 76 and the two slip rings 78, 80 and the two connections 84, 92 which are placed in electrical contact therewith are offset away from the bearing 42 and the end plate 44 in the axial direction A. The connections 84, 92 are therefore surrounded essentially completely in the radial direction R by the attachment region 26, and therefore by the rotor 22. As a result, the two brushes 58, 70 which are lengthened in the axial direction A project essentially completely through the shaft end 40, where, for example, the second guide 54 is also lengthened here in the axial direction A and projects through the shaft end 40 as far as the cross-sectional constriction 38. The two connecting ends 34, 36 are guided inward through openings (not illustrated) within the cross-sectional constriction 38 or within other regions of the hollow shaft 24. An enlarged region, within which further components of the electric motor 8, such as, for example, sensors, can be positioned, is provided between the rotor winding 32 and the end plate 44.

Figure 6:
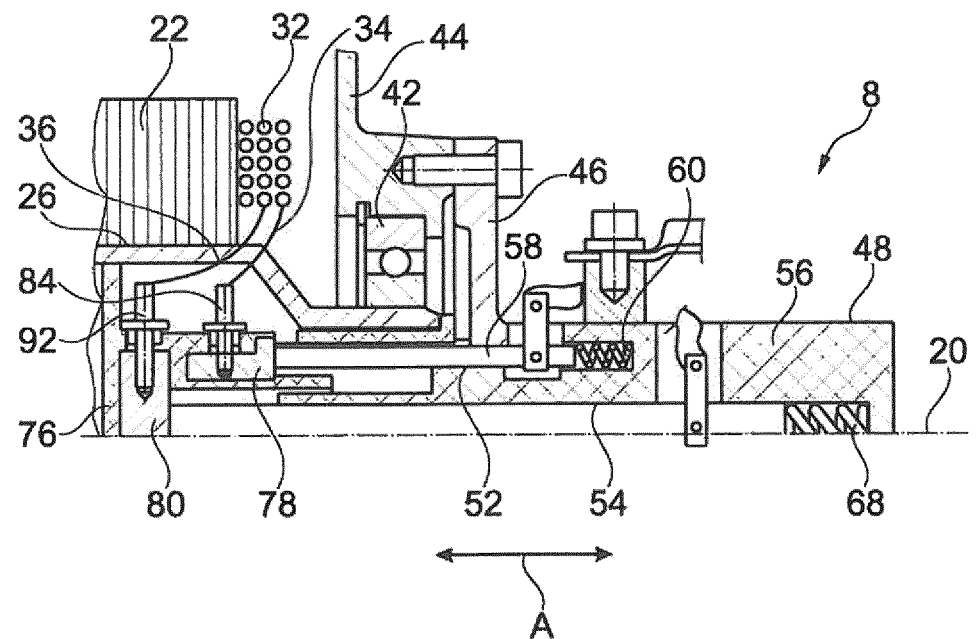

FIG. 6 illustrates a further example of the electric motor 8 which is illustrated in FIG. 5, where the shaft end 40 is of shortened configuration in the axial direction A. The two slip rings 78, 80 and the mounting element 76 are also surrounded by the rotor 22 in the radial direction here. The two connections 84, 92 and the two connecting ends 34, 36 are also left unchanged. However, the shape of the insulation body 56 and the two guides 52, 54 correspond essentially to the variant illustrated in FIG. 3 or FIG. 4. As a result, the rotor winding 32 is offset toward the end plate 44 in the axial direction A, for which reason the installation space of the electric motor is shortened in the axial direction A. Owing to the shortened hollow shaft 24, the weight is also reduced, which increases both the efficiency level and the dynamics of the electric motor 8.

The invention is not restricted to the exemplary embodiments described above. Instead, other variants of the invention can also be derived herefrom by a person skilled in the art, without departing from the subject matter of the invention. In addition, all the individual features which are described in conjunction with the individual exemplary embodiments can also be combined with one another in other ways without departing from the subject matter of the invention.

LIST OF REFERENCE SYMBOLS

2 Motor vehicle
4 Front wheel
6 Driven wheel
8 Electric motor
10 Drive axle
12 Energy accumulator
14 Controller
16 Stator
18 Electromagnet
20 Axis of rotation
22 Rotor
24 Hollow shaft
26 Attachment region
28 Rotor laminated core
30 Individual metal plate
32 Rotor winding
34 First connecting end
36 Second connecting end
38 Cross-sectional constriction
40 Shaft end
42 Bearing
44 End plate
46 Housing
48 Rotary transformer
50 Screw
52 First guide
54 Second guide
56 Insulation body
58 First brush
60 First spring element
62 First cutout
64 First contact element
66 First stranded conductor
68 Second spring element
70 Second brush
72 Second cutout
74 Second contact element
76 Mounting element
78 First slip ring
80 Second slip ring
82 Collar
84 First connection
86 First radial cutout
88 First insulation element
90 Free end of the first connection
92 Second connection
94 Second insulation element
96 Second radial cutout
98 Free end of the second connection
A Axial direction
R Radial direction
T Tangential direction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electric machine comprising:
a rotor;
a hollow shaft; and
a rotary transformer having a first slip ring and a first brush bearing on the first slip ring, a second slip ring that has a disc shape and is arranged within and connected to the hollow shaft, and a second brush that bears on the second slip ring,
wherein the rotor is connected to the hollow shaft and the hollow shaft is mounted such that it can rotate about an axis of rotation,
wherein the first slip ring is arranged within and connected to the hollow shaft,
wherein a contact surface of the first brush that contacts the first slip ring is arranged at a longitudinal end of the first brush and faces in a direction parallel to the axis of rotation, and
wherein the first slip ring is a hollow cylinder and has an L-shaped body including a collar that projects radially outward, and the second slip ring is arranged to project radially outward in parallel to the collar.

2. The electric machine according to claim 1,
wherein frictional engagement is produced between the first brush and the first slip ring via a first spring element, and
wherein a direction of force of the first spring element is parallel to the axis of rotation of the hollow shaft.

3. The electric machine according to claim 2,
wherein frictional engagement is produced between the second brush and the second slip ring via a second spring element that is different from the first spring element, and
wherein a direction of force of the second spring element is parallel to the axis of rotation of the hollow shaft.

4. The electric machine according to claim 1,
wherein the first slip ring has a collar.

5. The electric machine according to claim 1,
wherein the rotor has a rotor winding that is placed in electrical contact with the first slip ring by a first connection.

6. The electric machine according to claim 5,
wherein the first connection is pin-shaped and projects through a first radial cutout in the hollow shaft, and
wherein the rotor winding is connected to a free end that lies radially on the outside with respect to the hollow shaft.

7. The electric machine according to claim 1,
wherein the second slip ring has a smaller internal radius than the first slip ring.

8. The electric machine according to claim 1,
wherein the first brush is guided within a first guide of a housing of the rotary transformer, the housing being connected at the end side to an end plate that has a bearing for mounting the hollow shaft.

9. The electric machine according to claim 1,
wherein the rotary transformer is offset with respect to the rotor in an axial direction.

10. A motor vehicle having a driven wheel that is operatively connected to the electric machine according to claim 1.

11. The electric machine according to claim 1, wherein the electric machine is a motor vehicle.

* * * * *